(12) United States Patent
Hermann

(10) Patent No.: US 8,124,263 B2
(45) Date of Patent: Feb. 28, 2012

(54) CORROSION RESISTANT CELL MOUNTING WELL

(75) Inventor: Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 293 days.

(21) Appl. No.: 12/655,657

(22) Filed: Jan. 5, 2010

(65) Prior Publication Data

US 2011/0165446 A1 Jul. 7, 2011

(51) Int. Cl.
*H01M 2/10* (2006.01)
*H01M 10/40* (2006.01)

(52) U.S. Cl. ............. 429/99; 429/96; 429/100; 429/159
(58) Field of Classification Search .................. None
See application file for complete search history.

(56) References Cited

U.S. PATENT DOCUMENTS

| | | | |
|---|---|---|---|
| 6,174,618 B1 * | 1/2001 | Nishiyama et al. | 429/99 |
| 6,379,837 B1 * | 4/2002 | Takahashi et al. | 429/151 |
| 2009/0220852 A1 * | 9/2009 | Fujii | 429/72 |

* cited by examiner

*Primary Examiner* — John S Maples
(74) *Attorney, Agent, or Firm* — Patent Law Office of David G. Beck

(57) ABSTRACT

A battery mounting structure, preferably for use within a battery pack housing, is provided that prevents condensation-induced corrosion from occurring between the terminals of a battery.

17 Claims, 4 Drawing Sheets

CORROSION RESISTANT CELL MOUNTING WELL

FIELD OF THE INVENTION

The present invention relates generally to batteries, and more particularly, to a means for preventing condensation-induced corrosion.

BACKGROUND OF THE INVENTION

Batteries are subject to a variety of defects and failure mechanisms that may lead to impaired performance or catastrophic failure, as well as collateral damage to neighboring batteries, electronics, and miscellaneous structures. Exemplary defects and failure mechanisms include internal and external short circuits, thermal runaway, malfunctioning battery casings, and malfunctioning venting systems. These, and other, defects and failure mechanisms may be the result of manufacturing flaws, improper handling or storage, misuse, improper charging (for rechargeable batteries), or the environment in which the batteries operate or are stored. Environmental conditions such as temperature, humidity and pressure all play a significant role in the initiation of a battery failure.

FIG. 1 is a simplified cross-sectional view of a battery 100, for example a lithium ion battery utilizing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. For an 18650 cell, case 101 is comprised of a cylinder and an integrated, i.e., seamless, bottom surface 107. Cap assembly 105 includes a battery terminal 109, e.g., the positive terminal, and an insulator 111, insulator 111 preventing terminal 109 from making electrical contact with case 101. Cap assembly 105 typically also includes an internal positive temperature coefficient (PTC) current limiting device and a venting mechanism (neither shown), the venting mechanism designed to rupture at high pressures and provide a pathway for cell contents to escape. Cap assembly 105 may contain other seals and elements depending upon the selected design/configuration. Electrode assembly 103 is comprised of an anode sheet, a cathode sheet and an interposed separator, wound together in a spiral pattern often referred to as a 'jelly-roll'. An anode electrode tab 113 connects the anode electrode of the wound electrode assembly to the negative terminal while a cathode tab 115 connects the cathode electrode of the wound electrode assembly to the positive terminal. In the illustrated embodiment, the negative terminal is case 101 and the positive terminal is terminal 109. In most configurations, battery 100 also includes a pair of insulators 117/119. Case 101 includes a crimped portion 121 that is designed to help hold the internal elements, e.g., seals, electrode assembly, etc., in place.

In a battery such as that shown in FIG. 1, condensation can easily accumulate in area 123. Condensation accumulation is more likely to occur in applications in which the battery is subjected to a wide range of environments and operating conditions, for example the battery pack in an electric vehicle.

When condensation or water accumulates in area 123, or in a similar region in a battery with a different configuration, electrolytic and galvanic corrosion will typically occur due to the voltage differential and the different materials used for the battery case and the terminal. Electrolytic and galvanic corrosion leads to the rapid corrosion of the terminal, casing, or both. As a result, the life expectancy of the affected battery is greatly reduced. Additionally, as the affected battery corrodes, it may rupture which can lead to the damage or destruction of adjacent cells. Battery corrosion may also cause the affected battery to short circuit, which will not only affect the performance of the battery pack in which the affected battery resides, but may also lead to the battery entering into thermal runaway. Due to the large amount of thermal energy rapidly released during a thermal runaway event, cells in proximity to the affected cell may also enter into thermal runaway, leading to a cascading effect. As a result, power from the battery pack is interrupted and the system employing the battery pack is likely to incur extensive collateral damage due to the scale of thermal runaway and the associated release of thermal energy.

In a conventional battery pack, the battery regions of concern (e.g., region 123) remain susceptible to condensation. For example, FIG. 2 illustrates a portion of a conventional battery pack housing member with a plurality of batteries mounted within the corresponding mounting wells. As shown, the end region of each battery remains open to the environment and, as a result, allows condensation to continue to accumulate near the battery cap assemblies.

One approach to overcoming the electrolytic and galvanic corrosion problem is to apply a potting material to the end region of each battery. While such an approach does prevent corrosion, it prevents access to the battery terminal of the cap assembly (e.g., terminal 109 of FIG. 1). Therefore the potting material must be applied after coupling (e.g., resistance welding or soldering) the battery interconnect to the battery terminal. Unfortunately this approach prevents inspection and/or replacement of a battery interconnect after potting. The potting material may also interfere with the proper functioning of terminal interconnect fuses. Lastly, a large amount of potting material, for example that required to encase a large portion of a battery pack, adds significant weight and cost to the battery pack, thereby making this an undesirable, and in many cases unacceptable, solution.

Accordingly, what is needed is a means for preventing condensation-induced corrosion of a battery, and more specifically for preventing electrolytic and galvanic corrosion from occurring between the battery's cap assembly and casing. The present invention provides such a means.

SUMMARY OF THE INVENTION

The present invention provides a battery mounting structure, preferably for use within a battery pack housing, which prevents condensation-induced corrosion from occurring between the terminals of a battery. The cell mounting structure is comprised of a mounting well adapted to receive the end portion of a corresponding battery. The mounting well includes a central through-hole configured to receive the battery terminal. In at least one embodiment, the battery terminal extends through the hole within the mounting well. The mounting well is further comprised of an annular ring, preferably raised relative to the bottom surface of the mounting well, that encircles the through-hole and is sized to support the cap assembly of the battery. A gap, formed between the inner surface of the mounting well and the battery cap assembly, is filled with a sealant, the sealant forming a watertight seal that prevents condensation-induced corrosion from occurring between the terminals of the battery. The sealant is preferably comprised of an electrically insulating adhesive with a viscosity in the range of 100 cps to 2000 cps. In at least one embodiment, the cell mounting well includes a plurality of spacers integral to the mounting well sidewall, integral to the mounting well bottom surface, or both.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale. Accordingly, not all battery elements and/or battery pack elements are shown in the illustrations.

Figure 3:
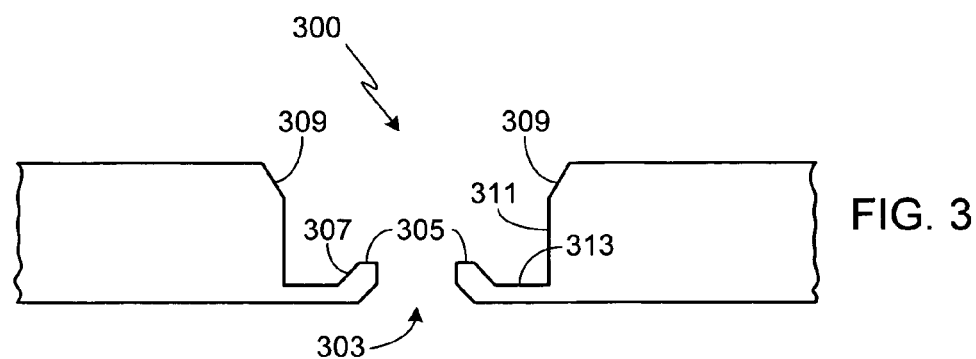
FIG. 3 provides a cross-sectional view of a battery mounting well in accordance with the invention.
Figure 4:
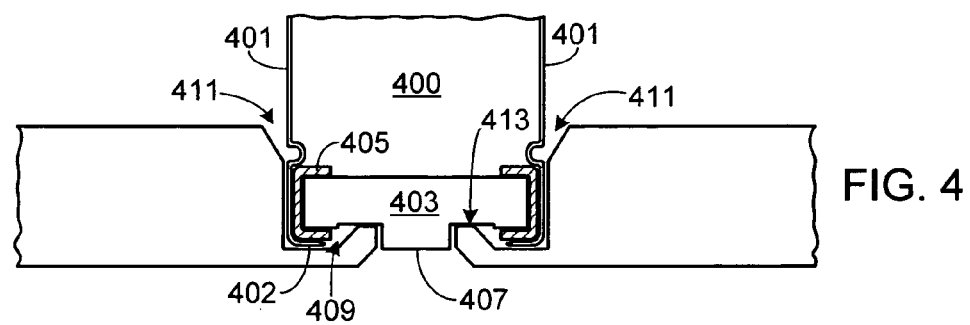
FIG. 4 illustrates the battery mounting well of FIG. 3 with a battery inserted into the battery mounting cavity of the structure.
Figure 5:
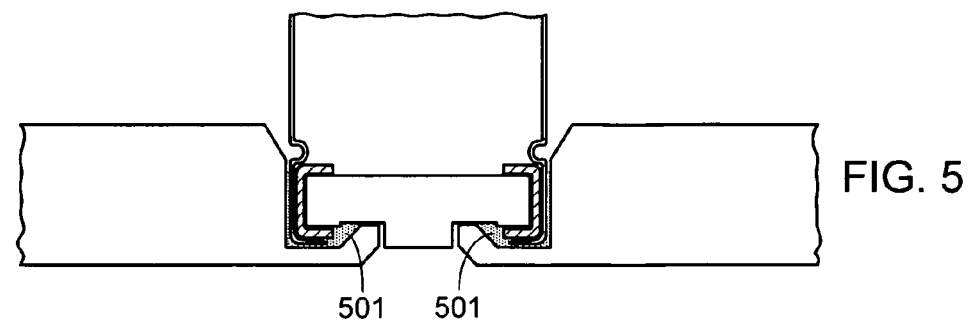
FIG. 5 provides an identical view to that shown in FIG. 4, with the inclusion of a bonding material.

FIGS. 3-5 provide a cross-sectional view of a portion of a battery mounting well 300 in accordance with the invention. Mounting well 300 is sized to accept the end portion of a battery. FIG. 4 illustrates a battery 400 mounted within mounting well 300. In this view, battery 400 has been simplified to include only a case comprised of a lateral outer surface 401 and an end surface 402, a generic cap assembly 403, and an electrical insulating gasket 405 that separates the case from cap assembly 403. The illustrated cap assembly 403 includes a battery terminal 407, but does not include any of the various interior components that typically comprise the cap assembly (e.g., a current interrupt device (CID), a positive temperature coefficient (PTC) element, a vent, seals, etc.). Mounting well 300 has a through-hole 303 in the center of well 300 that allows easy access to battery terminal 407 once the battery is mounted within the mounting well. In at least one embodiment, battery terminal 407 extends partially, or completely, through hole 303. An annular ring 305, preferably raised as shown, encircles through-hole 303 and is sized to support cap assembly 403 around terminal 407 while providing a gap 409 between wall 307 of annular ring 305 and adjacent portions of cap assembly 403 and gasket 405.

After battery 400 is inserted within cell mounting well 300, a sealant is administered between battery case 401 and the well, the sealant preventing condensation from bridging the gap between the battery case and the battery terminal. The union of annular ring 305 and the complementary surface of cap assembly 403 forms a sealant dam, the sealant dam preventing the sealant from escaping from gap 409, past annular ring 305, and covering battery terminal 407. Preferably recessed cavity 300 is chamfered as shown, chamfer 309 simplifying battery insertion as well as application of the sealant. Although not shown, in an alternate configuration the edge of well 300 has a radius that serves the same purposes as chamfer 309. The primary requirement for the sealant is that it be electrically insulating (i.e., high dielectric constant). Additionally, the sealant must have a sufficiently low viscosity (e.g., 100 to 2000 cps) to allow it to flow between the battery casing and the mounting well and then wick into region 409 prior to solidification. Preferably the selected sealant not only creates the desired watertight seal, but also bonds the battery in place, thus creating a strong, mechanical support structure for the batteries within a battery pack. It will be appreciated that the invention is not limited to a specific adhesive, rather any of a variety of adhesives may be used as long as they have the requisite viscosity and dielectric characteristics to ensure an adequate, electrically insulating seal. Exemplary adhesives include 1- and 2-part epoxies, silicon adhesives and urethane adhesives. In at least one preferred embodiment, a UV-activated epoxy is used.

FIG. 5 provides the same view of mounting well 300 and battery 400 as shown in FIG. 4, with the addition of an adhesive 501 within gap 409 as well as other regions separating the structure from battery case 401. This figure illustrates that once gap 409 is filled with adhesive 501, there is no longer a direct path between the battery case and the battery terminal, thereby essentially eliminating the risk of electrolytic and galvanic corrosion around the cap assembly.

As previously noted, the purpose of the present invention is two-fold. First and foremost, the disclosed mounting well creates a bonding dam that, once filled with adhesive, leaves the battery terminal uncovered while filling the gap between the battery case and the battery terminal. Second, the bond created by the mounting well and the sealant adds mechanical strength to the mounted battery. In the preferred embodiment described above, the bonding dam is formed, in part, by the annular ring 305 that is complementary to surface 413 of cap assembly 403. This configuration prevents adhesive from wicking out and potentially covering the terminal. It will be appreciated that in addition to forming a watertight seal as described above, the present invention requires a very small quantity of adhesive, thus overcoming another objection to the prior art's potting approach, i.e., weight gain.

Figure 6:
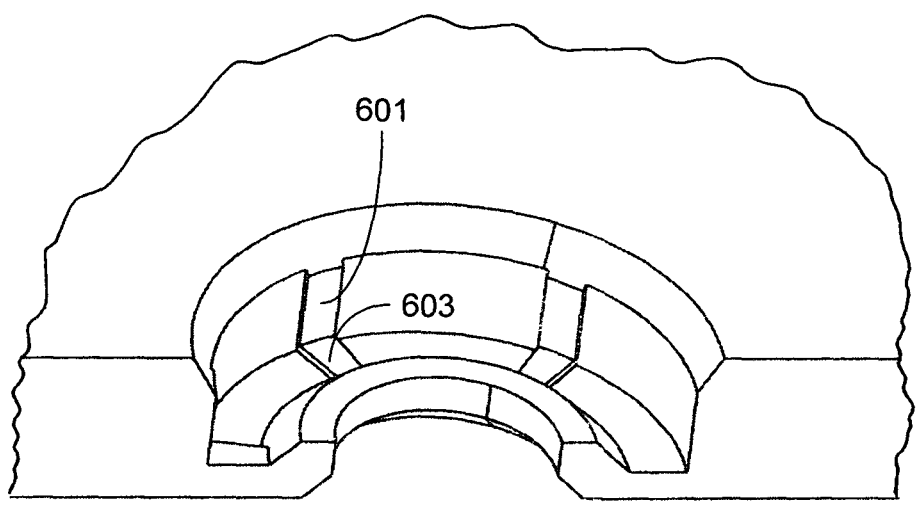
FIG. 6 provides a perspective, cross-sectional view of a mounting well with integral spacers.

FIG. 6 provides a perspective, cross-sectional view of a mounting well in accordance with the invention. This view shows a preferred embodiment of a mounting well in which the well includes a plurality of spacers 601 and 603. Spacers 601 are located on sidewall 311 of cavity 300 while spacers 603 are located on lower cavity surface 313. Spacers 601 and 603 are used to position the battery case sidewall and the battery case end surface, respectively, within cavity 300. Spacers 601 and 603 ensure that the battery is centered within recessed cavity 300, and that there is sufficient space around the entire battery periphery to allow adhesive wicking into bonding/sealing gap 409. While the embodiment shown in FIG. 6 is preferred, the inventor has determined that adequate adhesive wicking may be achieved using only spacers 601; alternately, only spacers 603; or alternately, neither spacers 601 or 603. Additionally, while spacers 601 and 603 are shown with a radial ribbed design, other spacer designs may be used to achieve the same goals with similar performance.

For example, in an alternate embodiment the spacers are comprised of a plurality of bumps or other raised regions.

Figure 1:
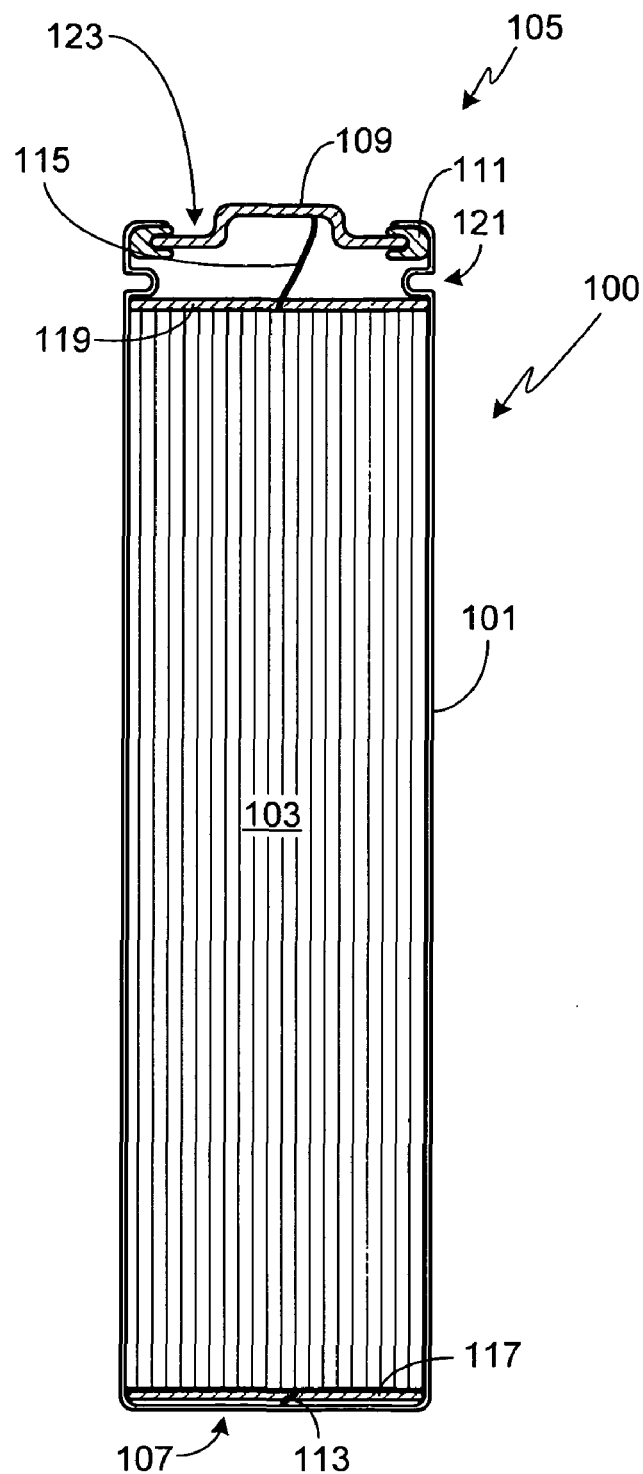
FIG. 1 provides a simplified cross-sectional view of a battery in accordance with the prior art.
Figure 2:
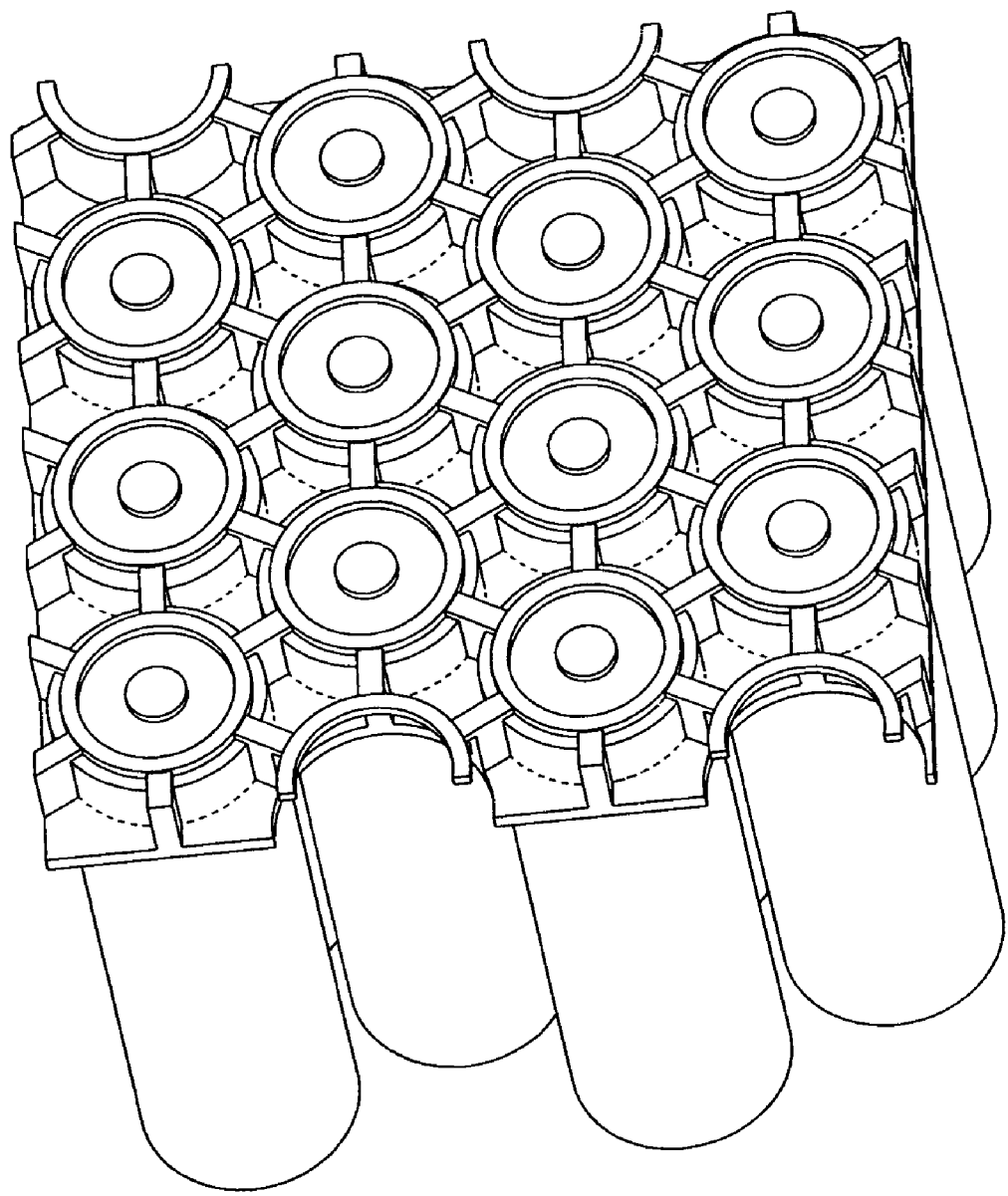
FIG. 2 provides a perspective view of a plurality of batteries mounted within a conventional battery pack housing member.

A condensation test was employed to compare the performance of cells utilizing the presently disclosed mounting well, and a conventional mounting structure. The cells were lithium-ion cells with an 18650 form-factor. The cells in the test were held in a thermal chamber that was maintained at a temperature of 40° C. During the test, every six hours a drop of water was placed on the positive terminal of each cell. As the cells were vertically positioned with the positive terminal (e.g., terminal 109 of FIG. 1) facing up, the water accumulated on the positive terminal. After a period of only a few days, the conventionally mounted cells began to show evidence of corrosion. By the end of the first week, the corrosion on the conventionally mounted cells was significant. After 28 days, the corrosion on the conventionally mounted cells was quite severe. In contrast, the cells using the mounting well of the present invention showed no signs of corrosion throughout the entire test.

In the previous description of the invention, the mounting well was shown with a cylindrical cell, and more specifically with a cylindrical cell utilizing the 18650 form-factor. It should be understood, however, that the problems outlined above may also occur in other cylindrical cells as well as those utilizing a different form-factor, as long as the proximity and geometry of the battery terminals is such that condensation can accumulate and cause electrolytic and/or galvanic corrosion to take place. In these cases, the benefits of the present invention are equally applicable as long as the disclosed mounting well is modified to match the specific geometry of the cell, thus allowing a watertight seal to be formed between the terminals.

For the sake of clarity, the illustrations and description provided above have been for a single mounting well. It is assumed, however, that the primary application for the invention is in a battery pack housing member designed to support and seal a plurality of cells (i.e., tens to thousands of cells). For such an application, the housing member would include a plurality of cell mounting wells 300. To ensure that the housing member does not create another source of corrosion, preferably the housing member is fabricated from an electrically non-conductive material. In addition, preferably the material selected for the housing member is lightweight, easily manufactured, and capable of forming a strong bond with the selected adhesive. Exemplary materials include composite materials and any of a variety of polymers, e.g., a thermoplastic such as a polycarbonate/ABS (acrylonitrile/butadiene/styrene) blend.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A battery pack housing member configured to be integrated into a battery pack, the battery pack housing member comprising:
   an interior surface partially defining an interior region of said battery pack; and
   a plurality of cell mounting wells formed within said interior surface of said battery pack housing member, wherein each cell mounting well of said plurality of cell mounting wells is adapted to receive a first end portion of a corresponding cell of a plurality of cells, wherein said first end portion includes a cap assembly comprised of a battery terminal, and wherein each of said plurality of cell mounting wells further comprises;
   a central through-hole configured to receive said battery terminal of said corresponding cell, wherein said cell mounting well has a single opening, said single opening comprised solely of said central through-hole;
   an annular ring encircling said central through-hole, said annular ring configured to support a complementary surface of said cap assembly of said corresponding cell;
   a gap formed between at least one inner surface of said cell mounting well and a corresponding region of said cap assembly of said corresponding cell, said gap encircling said annular ring, and wherein said gap is further defined by a union of said annular ring and said complementary surface of said cap assembly;
   a sealant disposed within said gap, said sealant forming a watertight seal between said cell mounting well and said corresponding region of said cap assembly of said corresponding cell wherein each cell of said plurality of cells is further comprised of a cell case, said cell case having a lateral outer surface and an end surface, said end surface comprised of a central opening, wherein said cap assembly closes said central opening, wherein an insulator is interposed between said cap assembly and said central opening of said case, and wherein said gap is further defined by said end surface of said cell case and a corresponding surface of said cell mounting well; and
   said sealant forms a watertight seal between an exposed portion of said insulator and said cell mounting well.

2. The battery pack housing member of claim 1, wherein said sealant forms a watertight seal between said end surface of said cell case and said corresponding surface of said cell mounting well.

3. The battery pack housing member of claim 1, wherein said annular ring is raised relative to a bottom surface of said cell mounting well.

4. The battery pack housing member of claim 1, wherein said battery terminal extends through said central through-hole.

5. The battery pack housing member of claim 1, wherein each cell mounting well of said plurality of cell mounting wells is chamfered.

6. The battery pack housing member of claim 1, wherein each cell mounting well of said plurality of cell mounting wells has a corner radius.

7. The battery pack housing member of claim 1, wherein each cell mounting well of said plurality of cell mounting wells further comprises a plurality of spacers integral to a bottom surface of said cell mounting well.

8. The battery pack housing member of claim 7, wherein each of said plurality of spacers is comprised of a ribbed structure.

9. The battery pack housing member of claim 7, wherein each of said plurality of spacers is comprised of at least one surface bump.

10. The battery pack housing member of claim 1, wherein each cell mounting well of said plurality of cell mounting wells further comprises a plurality of spacers integral to a side surface of said cell mounting well.

11. The battery pack housing member of claim 10, wherein each of said plurality of spacers is comprised of a ribbed structure.

12. The battery pack housing member of claim 10, wherein each of said plurality of spacers is comprised of at least one surface bump.

13. The battery pack housing member of claim 1, wherein said sealant has a viscosity in the range of 100 cps to 2000 cps.

14. The battery pack housing member of claim 1, wherein said sealant is electrically insulating.

15. The battery pack housing member of claim 1, wherein said sealant is selected from the group consisting of 1-part epoxies, 2-part epoxies, UV-activated epoxies, silicon adhesives and urethane adhesives.

16. The battery pack housing member of claim 1, wherein said battery pack housing is comprised of a material selected from the group of materials consisting of composites and polymers.

17. The battery pack housing member of claim 1, wherein each cell of said plurality of cells has an 18650 form-factor.

* * * * *